Figure 1:
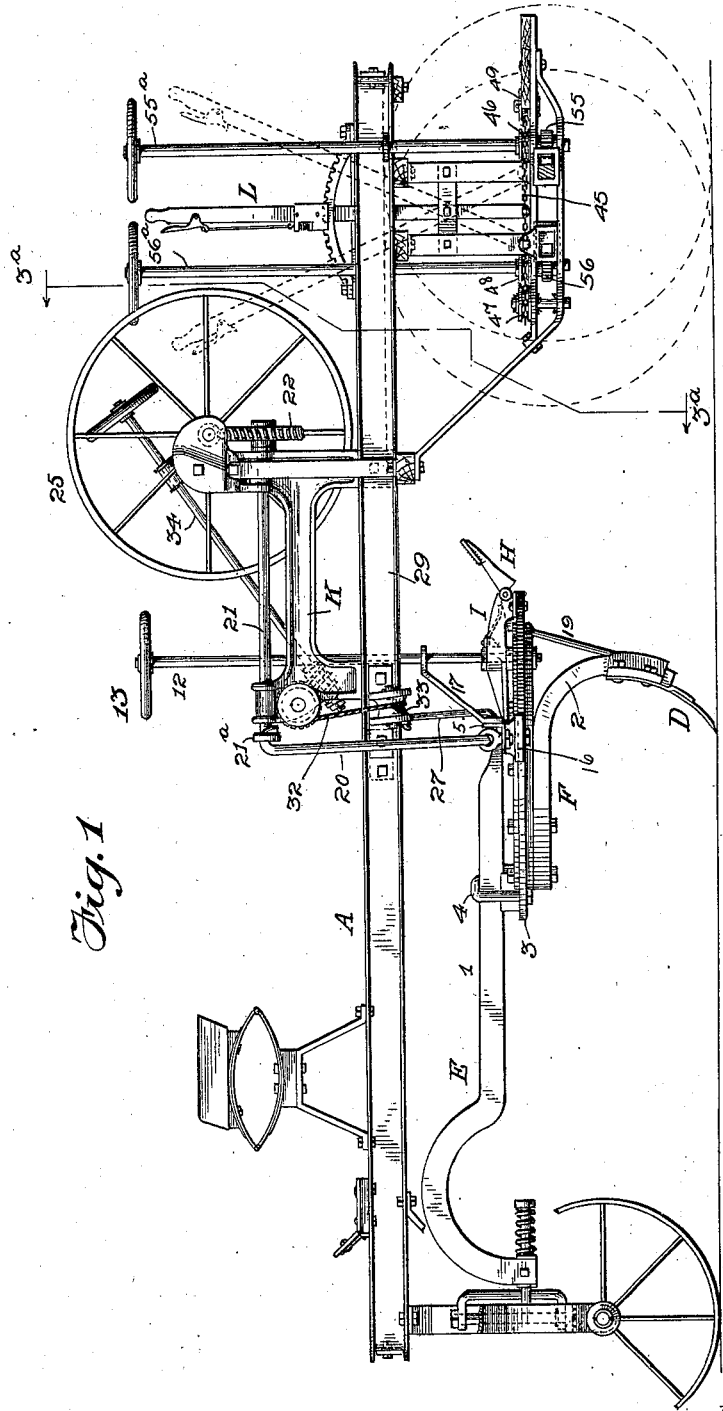

No. 724,042. PATENTED MAR. 31, 1903.
J. B. & B. O. RHODES.
MACHINE FOR MAKING AND REPAIRING ROADS.
APPLICATION FILED JAN. 2, 1903.
NO MODEL. 5 SHEETS—SHEET 2.

Witnesses:
Inventors
Jay B. Rhodes
Bert O. Rhodes
by Chas. G. Page Atty.

No. 724,042. PATENTED MAR. 31, 1903.
J. B. & B. O. RHODES.
MACHINE FOR MAKING AND REPAIRING ROADS.
APPLICATION FILED JAN. 2, 1903.
NO MODEL. 5 SHEETS—SHEET 3.
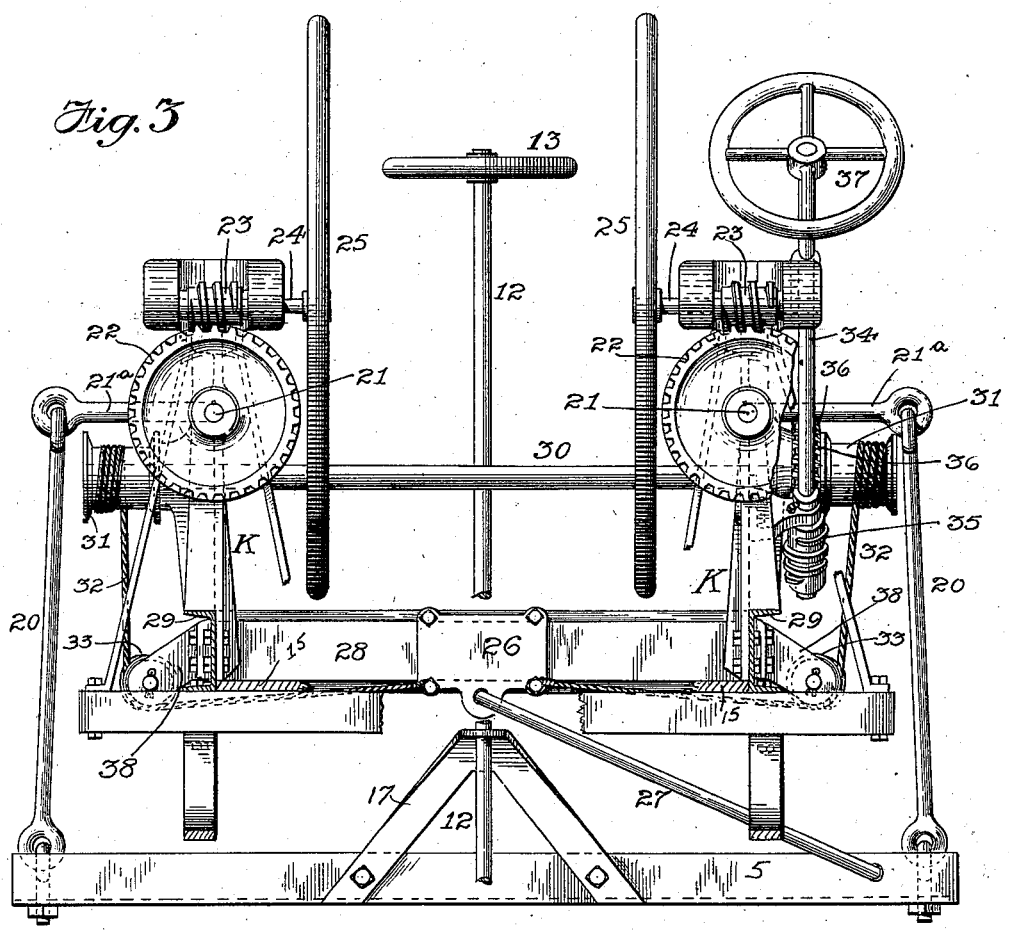
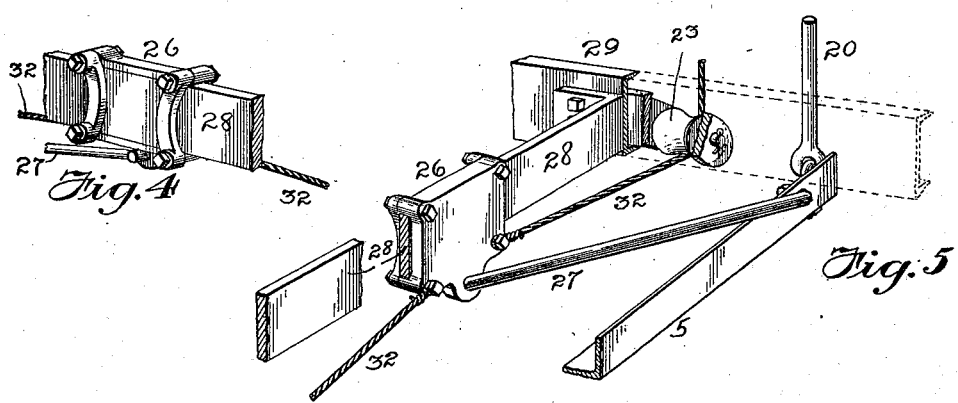
Witnesses: Inventors
Louis M. Whitehead Jay B. Rhodes
H. M. Krueger Bert O. Rhodes
by Chas. G. Page Atty.

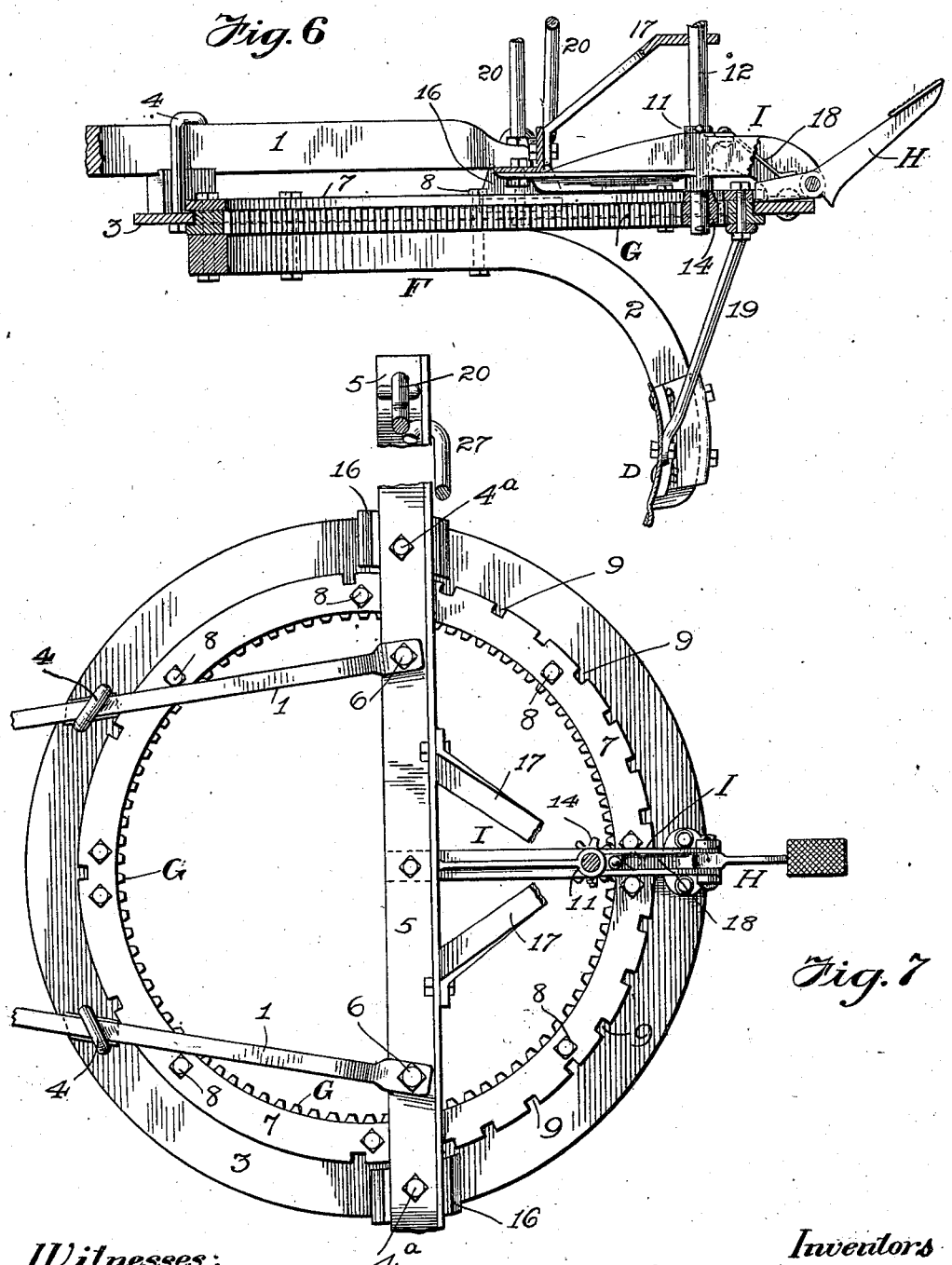

No. 724,042. PATENTED MAR. 31, 1903.
J. B. & B. O. RHODES.
MACHINE FOR MAKING AND REPAIRING ROADS.
APPLICATION FILED JAN. 2, 1903.
NO MODEL. 5 SHEETS—SHEET 5.
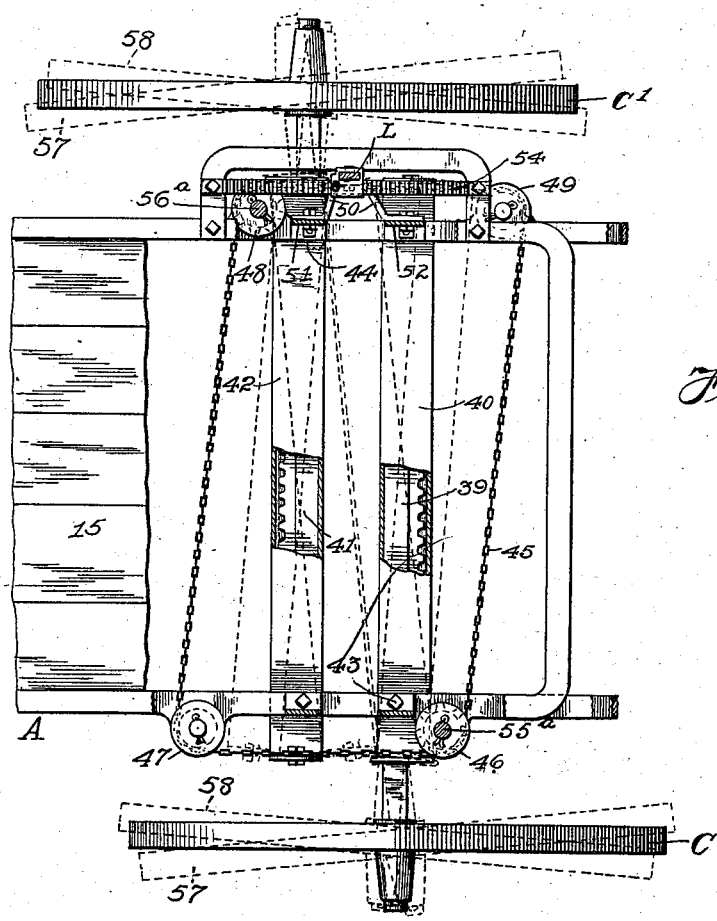
Fig. 8
Fig. 9
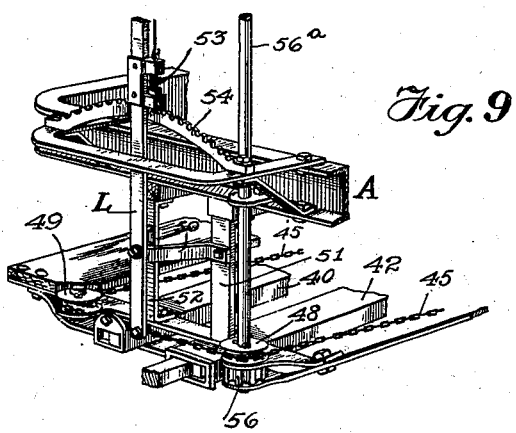
Witnesses:
Inventors.
Jay B. Rhodes
Bert O. Rhodes
by Chas. E. Page Atty.

UNITED STATES PATENT OFFICE.

JAY B. RHODES AND BERT O. RHODES, OF BARBERTON, OHIO, ASSIGNORS TO NATIONAL DRILL AND MANUFACTURING COMPANY, OF CHICAGO, ILLINOIS, A CORPORATION OF WEST VIRGINIA.

MACHINE FOR MAKING AND REPAIRING ROADS.

SPECIFICATION forming part of Letters Patent No. 724,042, dated March 31, 1903.

Application filed January 2, 1903. Serial No. 137,513. (No model.)

*To all whom it may concern:*

Be it known that we, JAY B. RHODES and BERT O. RHODES, citizens of the United States, residing at Barberton, in the county of Summit and State of Ohio, have invented certain new and useful Improvements in Machines for Making and Repairing Roads, of which the following is a specification.

Our invention relates to road making and repairing machines of the class in which a long scraper-blade is arranged for diagonal adjustment between the front and rear wheels of a suitable carriage and supported, whereby it can be raised and lowered and also bodily shifted toward either side of the machine and the rear wheels mounted upon horizontally-swinging axle portions, which can also be adjusted longitudinally for the purpose of varying the spread or distance between the rear wheels.

Objects of our invention are to provide a simple, durable, and compact construction of carrier or support for the scraper-blade, to provide improved means for bodily shifting the scraper-blade toward one and the other sides of the machine, to overcome certain defects in prior proposed arrangements of adjustable rear axles, to secure a greater range of relative adjustments on the part of the rear wheels, and to permit an attendant on the machine to quickly adjust and position the rear wheels with reference to the position of the scraper-blade and the character of the work, and to easily overcome the resistance to such adjustment, it being observed that as these road-making machines are large and heavy structures there is necessarily considerable resistance to the adjustment of the rear wheels and that in machines where such wheels are mounted upon a single long axle the longitudinal adjustment of the axle is relative to the body-frame and is practically attained by shifting the body-frame along the axle.

Figure 2:
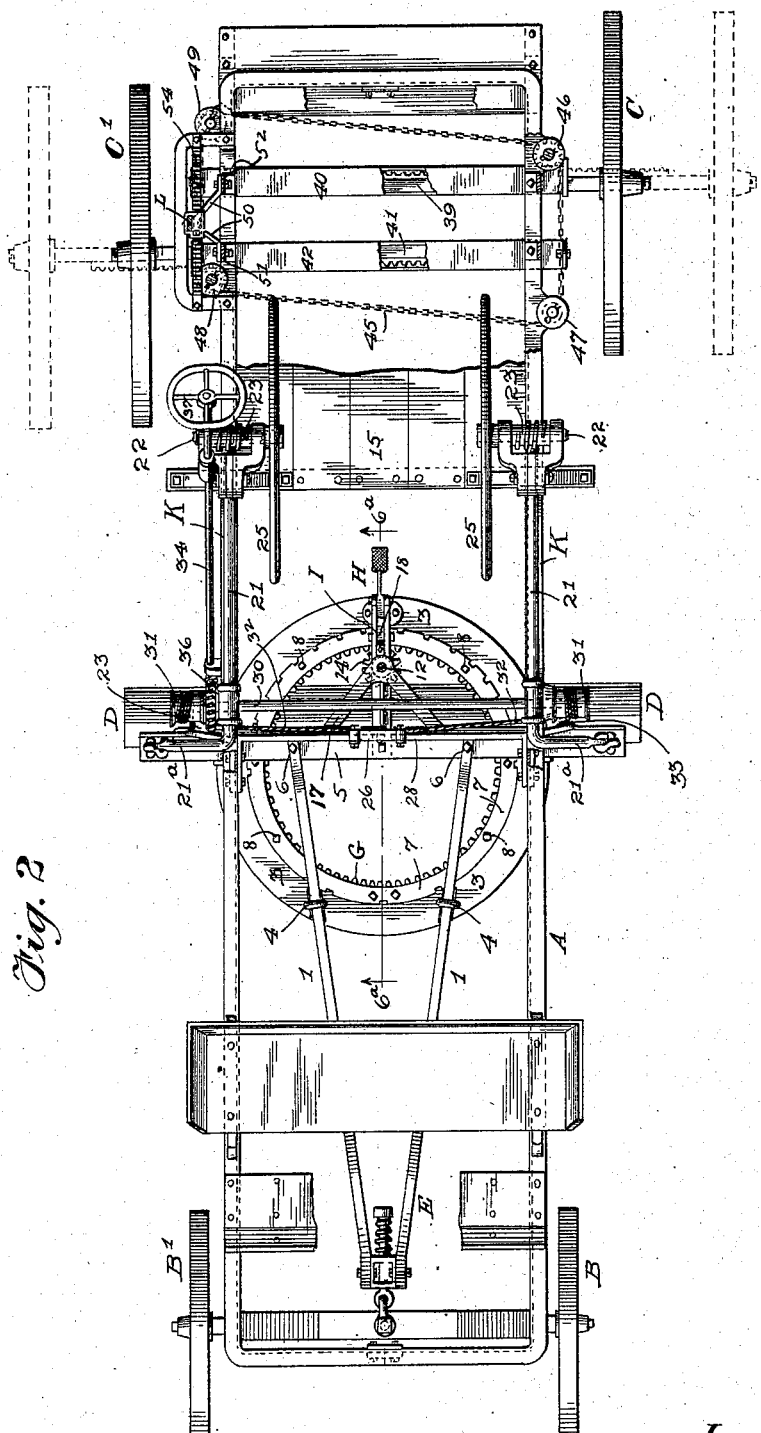

In the accompanying drawings, Figure 1 is a side elevation of the major portion of a machine embodying our invention, the rear wheels being removed and one of the rear axle portions being shown in cross-section. In this figure different positions which the rear wheels may be caused to assume are indicated by dotted lines and different positions of the lever for skewing or cramping the rear wheels are also indicated by dotted lines. Fig. 2 is a top plan view of the machine with a portion of the rear platform broken away, so as to expose the swinging axle boxes or housings, which latter are also partially broken away, so as to show the sliding axle portions. In this figure the lever for swinging the axle-boxes and the handwheel shafts for adjusting the axle portions are shown in horizontal section. This figure also illustrates in dotted lines the projection of the rear wheels from opposite sides of the machine. Fig. 3 is a section on line $3^a$ $3^a$ in Fig. 1 with the scraper-bar and the main portion of its support or carrier omitted. In this figure certain parts are broken away for convenience of illustration. Fig. 4 is a detail mainly illustrating the slide 26 for shifting the carrier or support for the scraper-blade. Fig. 5 is a detail also showing the slide of Fig. 4 and certain adjuncts. Fig. 6 is a section on a larger scale, taken on line $6^a$ $6^a$ in Fig. 2. Fig. 7 is a top plan view of the portion of the machine illustrated by Fig. 6, the scraper-blade and the yoke F to which it is attached being omitted. Fig. 8 represents, partly in top plan and partly in horizontal section, the rear portion of the machine, parts of the axle-boxes being broken away for convenience of illustration. Fig. 9 is a detail representing in perspective a portion of the devices for swinging the rear axle portions and for longitudinally adjusting the same.

The body-frame A of the machine is supported by a pair of front wheels B B' and a pair of rear wheels C C'. The scraper-blade D is arranged between the front and rear wheels and pivotally connected with a draft attachment or draw-bar E, which is in turn connected in any suitable way with the forward portion of the machine and preferably divided longitudinally to form a pair of side portions 1, which diverge rearwardly, so as to connect with the scraper-blade carrier at opposite sides of the center of the latter, and thereby permit a reliable connection to be made between the carrier and the draw-bar and avoid rupture of the connection between such members when they are subjected to the severe strains incident to use. The scraper-blade is attached to and backed by the downwardly-bent arm portions 2 of a yoke-shaped bar F, Fig. 6, having its forward horizontal portion bent into part-circular form and secured to the under side of an internally-toothed flat ring-gear G, which can be turned in opposite directions in alternation for the purpose of horizontally swinging the scraper in accordance with the desired adjustment of the latter. The ring-gear G has a rotary connection with and is supported by a ring-plate 3, which is in turn secured to the side portions of the draw-bar by bolts 4, having hook-shaped upper end portions engaging the draw-bar. The ring-plate 3 is also secured by bolts 4ª to a cross-bar 5, arranged above the ring-gear and ring-plate, Fig. 7, and the rear terminals of the sides of the draw-bar are bolted upon this cross-bar, as at 6 6. Connection between the ring-gear and said ring-plate is attained by forming the upper marginal portion of the ring-gear with an annular offset which receives the inner marginal portion of the ring-plate 3 and securing upon the ring-gear a flat ring-plate 7 by means of bolts 8. With this arrangement the ring-plate 7 forms, in conjunction with the annular offset in the ring-gear, an annular groove arranged in the periphery of the ring-gear and receiving the inner marginal portion of the ring-plate 3, which is rigid with the draw-bar. The parts thus constructed can be readily secured together and detached, and the outer marginal portion of ring-plate 7, which laps the inner marginal portion of ring-plate 3, forms a circular bearing, which rests and turns upon the ring-plate 3 when the ring-gear is turned for the purpose of adjusting the scraper-blade and which facilitates such turning on the part of the ring-gear.

The ring-plate 7, which is applied as a cap-plate forming a detachable bearing portion, is also employed as a rack which can be engaged by a foot-latch H for the purpose of locking the scraper-blade as adjusted, and to such end the ring-plate 7 is provided with peripherally-arranged notches 9, and the foot-latch, which is pivotally supported upon the ring-plate 3, has its forward end portion arranged to engage in the notched portions of the ring-plate 7. The outer marginal portion of the ring-plate 3 projects laterally and outwardly from the ring-gear and forms an exposed annular ledge or seat for the rear end of a bar or bracket I, to which the foot-latch is conveniently pivoted. This bar or bracket I extends over the ring-plate 7 and has its end portions respectively bolted to the cross-bar 5 and the outer marginal portion of the ring-plate 3, and at a point between its end portions it is adapted to provide a bearing 11, Fig. 6, for a vertical hand-wheel shaft or spindle 12. This rotary hand-wheel shaft is provided at its upper end with a hand-wheel 13, Fig. 1, and at its lower end with a pinion 14, arranged to engage the gear-teeth along the inner edge of the ring-gear, whereby an attendant standing upon a platform 15 on the body-frame, Fig. 2, can readily operate the rotary hand-wheel shaft for the purpose of turning the ring-gear, and thereby adjusting the scraper-blade. By this arrangement the bearing for the hand-wheel shaft 12 is formed at a point between the ends of the bracket I, which has one of such ends rigidly bolted to the cross-bar 5 and its opposite end directly bolted to the ring-plate 3, which is in turn bolted to the cross-bar, it being observed that the cross-bar 5 has its end portions held upon seats or bearings 16, Fig. 7, which rise from the ring-plate 3, so as to permit bar 5 to extend over the ring-plate 7 and allow the latter, which is bolted to the ring-gear, to revolve. The hand-wheel shaft is also further steadied by a brace or bracket 17, having its lower forward end portion bolted to the vertical flange portion of the angle-bar 5 and having its upper rear end portion adapted to provide a bearing for the said hand-wheel shaft. The rear end portion of the longitudinally-extending bar or bracket I is recessed or slotted to receive a portion of the foot-latch, and the latter is normally held in position to engage the notched ring-plate 7 by means of a spring 18, Fig. 6, attached to said bracket. The rear end portion of the foot-latch is also within convenient reach of the foot-latch of an attendant standing upon the platform 15, and hence the attendant can easily operate both the hand-wheel shaft and the foot-latch. The downwardly-bent arms 2 of the yoke-bar F and the scraper-blade secured thereto are also braced by an inclined yoke-shaped brace-rod 19, having one of its arms shown in Fig. 6. This yoke-shaped brace has its upper portion bolted to the ring-gear, and it is arranged to slope from such point of connection downwardly and forwardly toward a vertical axis about which the ring-gear operates, and in this way the ring-gear has one portion connected with the scraper-blade by the yoke F and an opposite portion connected with the scraper-blade by the inclined backing-brace 19. The support or carrier for the scraper-blade thus comprising the ring-plates, ring-gear, and yoke F is attached to the rear end of the draw-bar, which is in turn connected with the forward portion of the machine, such as the front axle or bolster, in any suitable way whereby it may swing both laterally and vertically to permit the carrier and blade to be raised and lowered and also shifted toward opposite sides of the machine in alternation, as occasion may require. The support or carrier for the blade is suspended by links 20 from some suitable raising and lowering mechanism, such as a pair of parallel rock-shafts 21, mounted upon bracket-bearings K, Figs. 1 and 3, on the body-frame and having their forward end portions adapted to form crank-arms 21ª, arranged to swing in a vertical plane transverse to the length of the body-frame and connected with the upper ends of the links 20, which are attached to the cross-bar 5. The rotary shafts 21 are arranged to turn about horizontal axes parallel with the length of the body-frame, and as a means for actuating said rock-shaft their rear ends are provided with gears 22, which are engaged by worms 23 on the short transversely-arranged spindles 24, Fig. 3. These spindles are in turn provided with hand-wheels 25, also arranged within reach of an attendant standing upon the platform 15.

As a means for shifting the scraper-blade toward opposite sides of the machine the support or carrier for the scraper-blade is connected with a slide 26 (see Figs. 3, 4, and 5) by an inclined link 27, having its upper end attached to the slide and its lower end attached to cross-bar 5 on the carrier or support for the scraper-blade. The slide 26 is arranged to reciprocate horizontally in directions transverse to the length of the body-frame, and to such end it is supported and guided in its movement by a cross-bar 28, which is secured at its ends to the side bars 29 of the body-frame. As a device for shifting this slide the brackets K, which are arranged upon opposite sides of the body-frame, support a rotary shaft 30, which is positioned transversely to the length of the body-frame and provided at its ends with winding-drums 31 for chains or cables 32, which pass downwardly from the winding-drums to and under guide-pulleys 33 on the sides of the body-frame and thence to the slide to which they are attached. The rotary shaft 30, upon which the winding-drums are secured, can be turned in opposite directions in alternation by an inclined hand-wheel shaft 34, supported upon the body-frame and having its lower end portion provided with a worm 35, Fig. 3, which engages a gear 36 on the shaft 30, the hand-wheel 37 on shaft 34 being also within reach of an attendant upon the platform 15. The link 27 connects with the lower portion of the slide 26 at a point between the points at which the chains or cables 32 are attached to such slide, and hence when shaft 30 is operated so as to cause one or the other of the chains or cables to pull upon the slide the draft will be in line or substantially in line with the connection between the link 27 and the slide, and thereby avoid cramping the slide upon the cross-bar 28, on which it moves. The guide-pulleys 33 are supported by bearings 38, Fig. 3, on the sides of the body-frame and positioned so that the portions of the chains or cables between such guide-pulleys and the slide will be substantially parallel with the cross-bar 28, whereby the draft on the slide will be substantially in the direction of the length of the cross-bar. By this arrangement the slide has a range of movement from side to side of the machine, it being observed that when the slide is thus shifted so as to shift the blade-carrier and scraper-blade bodily toward one or the other sides of the machine the links 20 will swing in conformity with the bodily side shift of the blade support or carrier to which they are attached and that by arranging the arms 21ª of the rock-shafts 21 to extend laterally outward from opposite sides of the machine and to swing in vertical planes transverse to the length of the body-frame the blade-carrier and blade will have a wide range of side shift.

In order to position the rear wheels with reference to various conditions and to permit an attendant upon the machine to easily and quickly adjust or position them, the rear wheels C and C' are respectively mounted upon independent axle portions each shorter than an ordinary rear axle and both supported for longitudinal adjustment, one of these axle portions being pivotally supported at one side of the machine and the other being pivotally supported at the opposite side of the machine, as illustrated by Figs. 2, 8, and 9. The axle portion 39 for the rear wheel C is arranged to slide within an elongated box or housing 40, and the axle portion 41 for the rear wheel C' is arranged to slide within a like box or housing 42. The box or housing 40 is pivoted upon the body-frame at one side of the machine, as at 43, Fig. 8, and the box or housing 42 is pivoted upon the body-frame at the opposite side of the machine, as at 44. A chain or cable 45 passes about guide-pulleys 46 47 on one side of the body-frame and about like guide-pulleys 48 and 49 on the opposite side of the body-frame, and at a point between the pulleys 48 and 49 said chain or cable is attached to the free end of each of the two swinging boxes or housings, and it is also attached to an operating device, such as a hand-lever L, as best shown in Fig. 9. The chain is attached to the lower arm of the lever, which is pivoted upon any suitable support, such as a bearing 50 on hangers 51 and 52, arranged upon one side of the body-frame. The lever is also provided with a latch 53, which can engage a rack 54 for the purpose of locking the lever. With this arrangement the axle portions have racks or rack-teeth which are engaged by pinions for the purpose of adjusting these axle portions longitudinally and independently of the swinging boxes or housings on which they are arranged to slide, these operating-pinions 55 and 56 being shown in Fig. 1 as arranged upon upwardly-extending hand-wheel shafts 55ª and 56ª, respectively. By such arrangement the lever L can be operated so as to draw the chain or cable in either direction at will, so as to swing the boxes or housings, and by operating one or the other of the hand-wheel shafts the axle portions with which they are gear-connected can be adjusted longitudinally and independently of the boxes or housings. The horizontally-swinging boxes or housings extend from side to side of the machine and practically form levers having the moving power applied to their free ends, the chain or cable being at one side of the machine attached to the free end of the box or housing 40 and being at the opposite side of the machine attached to the free end of the box or housing 42. The axle portions which project from the pivoted ends of these boxes or housings form the short arms of the levers involved, these short arms being adjusted in length by adjusting the axle portions longitudinally and independently of the boxes or housings. In this way the skewing of the rear wheels can be easily attained by the application of power to the long arms of levers having the wheels upon their short arms, and when power is thus applied the two levers will be swung synchronously and will at all times maintain a condition of relative parallelism, whereby the two rear wheels will be kept in parallel planes, whether such planes are parallel or oblique to the length of the body-frame. By operating the chain or cable the axle portions can be swung so as to set the wheels oblique to the length of the body-frame, and thereby overcome or resist side draft induced by the action of the oblique or diagonally-positioned blade upon the soil, and, if necessary, one axle portion can also be caused to project from the machine to a greater extent than the other axle portion as an auxiliary to this skewing of the wheels. The axle portions can also be independently adjusted with reference to conditions of the road and the position of the adjustable scraper-blade, and also with reference to the horizontal angles of the axle portions relatively to the length of the body-frame. When the chain which serves to swing these pivoted boxes or housings is drawn in one direction, the two boxes or housings will swing in directions to widen the space between them, and when the movement of the chain is reversed they will swing in directions to contract the space between them; but during each of such two movements they will remain parallel. Broadly considered, the two axle portions are pivotally supported, respectively, at opposite sides of the middle of the body-frame, and as a further feature they are arranged for end adjustment independently of their pivotal connections and independently of each other. Also each axle portion is pivotally supported as a lever having a wheel on its short arm and the power for swinging it applied to its long arm, the power being applied to their long arms so as to synchronously swing the levers in opposite directions and at the same time maintain them relatively parallel. As each axle portion is capable of endwise or longitudinal adjustment independently of the other axle portion, either of the rear wheels can be set out from the body-frame to an extent proportional to need, and thereby caused to run in a line or lines selected with reference to the furrow-line, which is determined by the relative position of the forward end of the reversible scraper-blade, and when running close to a bank the rear wheel nearest the same can be set in or toward the body-frame. For certain work the spread of or distance between the rear wheels can be increased, as indicated by dotted lines in Fig. 2, and for other work the rear wheels can be brought close together, as indicated by full lines in said figure, and obviously these two wheels can be set at either equal or unequal distances from the body-frame. The rear wheels can also be cramped or skewed, as indicated by dotted lines in Fig. 8, wherein it will be seen that by moving or drawing the operating-chain in one direction the rear wheels will be set in parallel vertical planes oblique to the length of the body-frame, as indicated by dotted lines 57 57, and that by reversely moving or drawing the chain the said wheels can be set in reversely-oblique planes, as indicated by dotted lines 58 58. The axle portions can also be adjusted longitudinally with reference to the relatively oblique positions of the wheels, so that while both wheels can be simultaneously skewed or cramped the spread or distance between such wheels can be varied in accordance with the condition of the road, the character of the work, and the position of the reversible and diagonally-adjustable scraper-blade. The pulleys for the chain which is employed to swing the axle portions are arranged as idler-pulleys and can be supported upon the body-frame in any suitable way. In the arrangement shown two of these idler-pulleys are respectively arranged loose upon one and the other of the vertical hand-wheel shafts 55$^a$ and 56$^a$ and conveniently positioned above the pinions, which are secured upon said shafts and employed to engage the racks or rack portions 39$^a$ and 41$^a$ of the adjustable axle portions at points adjacent to the points where the swinging axle boxes or housings 40 and 42 are pivotally connected with the body-frame.

What we claim as our invention is—

1. In a machine for making and repairing roads, the rear supporting-wheels having separate axle portions arranged for independent longitudinal adjustment and pivotally connected with the body-frame of the machine respectively at opposite sides of a point between the rear wheels.

2. In a machine for making and repairing roads, the rear supporting-wheels having separate axle portions arranged for independent longitudinal adjustment, each axle portion being pivotally supported to form a lever having a long and short arm and having a rear wheel on its short arm; and a device adapted for simultaneously swinging the axle portions and arranged to apply the moving power to their end portions which form the long arms of said levers.

3. In a machine for making and repairing roads, a pair of axle boxes or bearings extending transversely across the body-frame and respectively pivoted at opposite sides of the machine; separate axle portions arranged for independent longitudinal adjustment and having sliding connections respectively with one and the other of the swinging axle boxes or housings, each axle portion being provided with a line of rack-teeth; rear wheels on parts of the axle portions projecting from the axle boxes or housings; pinions engaging rack-teeth on the axle portions; and a device for simultaneously swinging the pivoted axle boxes or housings arranged to apply the moving power to the free ends of the latter.

4. In a machine for making and repairing roads, the rear supporting-wheels having separate axle portions arranged for independent longitudinal adjustment, each axle portion being pivotally supported to form a lever having a long and a short arm and having a rear wheel on its short arm; and mechanism adapted for simultaneously swinging the axle portions and comprising a chain or cable power-transmitting device arranged to apply the moving power to the long arms of the levers formed by the axle portions, and a device for operating the chain or cable power-transmitting device.

5. In a machine for making and repairing roads, a pair of axle boxes or housings extending transversely across the body-frame and respectively pivoted at opposite sides of the machine; separate axle portions arranged for independent longitudinal adjustment and having sliding connections respectively with one and the other of the swinging axle boxes or housings, each axle portion being provided with a line of rack-teeth; rear wheels on parts of the axle portions projecting from the axle boxes or housings; pinions engaging the rack-teeth on the axle portions; and a device for simultaneously swinging the pivoted axle boxes or housings arranged to apply the moving power to the free ends of the latter and comprising a chain or cable power-transmitting device connected with the free end portions of the swinging axle boxes or housings, and means for operating such chain or cable power-transmitting device.

6. In a machine for making and repairing roads, a pair of axle boxes or bearings extending transversely across the body-frame and respectively pivoted at opposite sides of the machine; separate axle portions arranged for independent longitudinal adjustment and having sliding connections respectively with one and the other of the swinging axle boxes or housings, each axle portion being provided with a line of rack-teeth; rear wheels on parts of the axle portions projecting from the axle boxes or housings; pinions engaging rack-teeth on the axle portions; and a device for simultaneously swinging the pivoted axle boxes or housings arranged to apply the moving power to the free end of the latter and comprising a chain or cable power-transmitting device connected with the free end portions of the swinging axle boxes or housings, and means for operating such chain or cable power-transmitting device consisting of a hand-lever supported upon the body-frame of the machine.

7. In a machine for making and repairing roads, a wheeled body-frame; a diagonally-adjustable scraper-blade arranged between the front and rear wheels; a support for the scraper-blade suspended by raising and lowering mechanism and capable of lateral swing; a laterally-swinging draw-bar connecting said support with the forward part of the machine; and a device for laterally adjusting the support for the scraper-blade comprising a transversely-arranged rotary shaft having winding-drums secured thereon and supported upon the body-frame; a slide arranged to traverse a cross-bar on the body-frame; chain or cable portions connecting the slide with the winding-drums and passing about guide-pulleys respectively at opposite sides of the machine; a link connecting the slide with the support for the scraper-blade; and a device for operating the shaft on which the winding-drums are secured.

8. In a machine for making and repairing roads, an internally-toothed ring-gear G having an annular offset in its upper, outer marginal portion; a yoke F bolted to the under side of the ring-gear and provided with a scraper-blade; a peripherally-notched ring-plate 7 bolted upon the ring-gear and overhanging the annular offset in the latter; a ring-plate 3 having its inner marginal portion engaging in the annular offset in the ring-gear and covered by the outer marginal portion of the ring-plate 7; a cross-bar secured upon the ring-plate 3; a draw-bar having rear end portions secured to the ring-plate 3 and the cross-bar; a bracket I secured to the cross-bar and to the ring-plate 3; a spindle having a bearing in one bracket and provided with a pinion which engages the teeth along the inner edge of the ring-gear; and a foot-latch also supported upon said bracket and arranged for engaging the notched ring-plate 7.

JAY B. RHODES.
BERT O. RHODES.

Witnesses:
R. A. COLTON,
O. D. EVERHARD.